United States Patent
Konya et al.

(10) Patent No.: US 6,863,243 B2
(45) Date of Patent: Mar. 8, 2005

(54) MULTI-PURPOSE AIRCRAFT SERVICING BRIDGE

(75) Inventors: Kazuhide Konya, Mercer Island, WA (US); William R. McCoskey, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/242,179

(22) Filed: Sep. 12, 2002

(65) Prior Publication Data

US 2004/0051000 A1 Mar. 18, 2004

(51) Int. Cl.[7] .................................................. B64D 9/00
(52) U.S. Cl. ..................................... 244/137.2; 14/71.5
(58) Field of Search ...................... 244/137.2, 137.1; 14/71.5

(56) References Cited

U.S. PATENT DOCUMENTS

| | | | | | |
|---|---|---|---|---|---|
| 3,110,048 | A | * | 11/1963 | Bolton | 14/71.5 |
| 3,412,412 | A | * | 11/1968 | Kjerulf et al. | 14/71.5 |
| 3,524,207 | A | * | 8/1970 | Giarretto | 14/71.5 |
| 3,538,529 | A | * | 11/1970 | Breier | 14/71.5 |
| 3,808,626 | A | * | 5/1974 | Magill | 14/71.5 |
| 4,416,435 | A | * | 11/1983 | Szendrodi et al. | 244/137.2 |
| 6,487,743 | B1 | * | 12/2002 | Nicoletti | 14/71.5 |
| 2002/0104176 | A1 | * | 8/2002 | Thomas et al. | 14/71.5 |
| 2003/0145402 | A1 | * | 8/2003 | Hutton et al. | 14/71.5 |
| 2003/0189135 | A1 | * | 10/2003 | Konya | 244/137.2 |

\* cited by examiner

*Primary Examiner*—Galen Barefoot
(74) *Attorney, Agent, or Firm*—Artz & Artz, P.C.

(57) ABSTRACT

A multi-purpose aircraft servicing system (10) for an aircraft (12) is provided. The system (10) includes a multi-servicing bridge 16 having a main bridge section (26) with a plurality of bridge servicing units (56). A bridgehead (28) is mechanically coupled to the main bridge section (26) and mates to the aircraft (12). A method of servicing the aircraft (12) is also provided including parking the aircraft (12) at a terminal (24). The multi-purpose aircraft servicing system (10) is rotated to mate with the aircraft (12). The aircraft (12) is serviced from at least one side of the aircraft (12).

20 Claims, 3 Drawing Sheets

MULTI-PURPOSE AIRCRAFT SERVICING BRIDGE

TECHNICAL FIELD

The present invention relates generally to aeronautical vehicle systems, and more particularly, to a method and system for servicing an aircraft.

BACKGROUND OF THE INVENTION

Aircraft servicing efficiency is of the essence in airline industry. Time involved in performing various servicing tasks is directly related to the amount of time an aircraft is able to spend in flight. The more an aircraft is in flight the higher the potential profits associated with that aircraft.

Servicing an aircraft includes passenger boarding and enplaning of the aircraft, cargo servicing, galley servicing, and passenger compartment servicing or sometimes referred to as cabin cleaning. Timing, sequencing, and manner as to which the aircraft servicing is performed are critical in minimizing turnaround time of the aircraft.

Currently, servicing is performed utilizing a passenger bridge and service vehicles for galley, cleaning, and cargo handling. Passengers enplane and deplane only from a port side of the aircraft using a passenger-bridge. Typical passenger-bridges are capable of extending, through the use of telescoping sections, to mate with the aircraft. Vehicles for Galley, cleaning, and cargo handling are used to perform respective tasks only on a starboard side of the aircraft. The passenger servicing task is performed sequentially with the galley and cabin cleaning servicing in order to prevent interference with passengers and servicing crew members. The potential for interference with passengers and servicing crew members exists in forward portions of the aircraft since the passengers deplane in the forward portion of the aircraft and passengers and servicing crew members use the same isles of the aircraft. Servicing crew members are able to service aft portions of the aircraft, when an aircraft requires such servicing, simultaneously with deplaning of the aircraft, as no interference exists during deplaning between passengers and crew members in the aft portion of the aircraft.

Three main types of airline bridges currently exist for passenger enplaning and deplaning of an aircraft. The three types are an apron drive bridge, a radial bridge, and a fixed pedestal bridge. The apron drive bridge is the most complex due to its rotating and telescoping capabilities, which allow for some freedom in parking location of an aircraft on an apron. The radial bridge and the fixed pedestal bridge require that the aircraft be parked at a specific spot on the apron. The radial bridge is rotated to mate a bridgehead to a passenger door. The fixed pedestel bridge is the least expensive of the three main types of bridges. The fixed pedestal bridge has a fixed main portion and an adjustable bridgehead. The pedestel bridge has a bridgehead that retracts when an aircraft is approaching an apron and extends when the aircraft is parked, at which time the bridgehead docks to an aircraft passenger door.

The use of galley, cleaning, and cargo handling vehicles can be time consuming due to steps involved in servicing the aircraft and aircraft servicing location availability. The trucks typically need to be loaded at a location that is a considerable distance from an airline terminal of interest and driven over to the airline terminal, mated to the aircraft, and unloaded to service the aircraft. Aircraft servicing location availability is limited since truck servicing of the aircraft can only be performed from the starboard side of the aircraft so as not to interfere with the passenger bridge on the port side of the aircraft. Mating of the trucks to the aircraft is also undesirable since an aircraft can potentially be damaged in the process.

Current servicing of an aircraft is not efficient and current bridge designs are not physically applicable to newly introduced faster flying aircraft configurations. For example, a sonic cruiser is being studied by The Boeing Company that has a canard wing in an upper forward portion of the aircraft, which interferes with current passenger bridge designs. Also, due to relationship of aircraft servicing doors and aircraft wings, long turnaround times are required for servicing the sonic cruiser. The longer time spent servicing the aircraft on the ground negates the benefit of the faster flying capability in terms of overall aircraft utilization.

Through introduction of faster flying aircraft and need for increased number of flights per aircraft, there is a desire to increase the efficiency of aircraft servicing. It is therefore, desirable to provide an aircraft servicing apparatus and method that accounts for newly introduced aircraft configurations and provides increased servicing efficiency for both traditional style aircraft and newly introduced aircraft.

SUMMARY OF THE INVENTION

The present invention provides a method and system for servicing an aircraft. A multi-purpose aircraft servicing system for an aircraft is provided. The system includes a multi-servicing bridge having a main bridge section with a plurality of bridge servicing units. A bridgehead is mechanically coupled to the main bridge section and mates to the aircraft. A method of servicing the aircraft is also provided including parking the aircraft at a terminal. The multi-purpose aircraft servicing system is rotated to mate with the aircraft. The aircraft is serviced from at least one side of the aircraft.

The present invention has several advantages over existing aircraft servicing systems. One advantage of the present invention is that it provides multiple servicing passageways and multiple servicing units within a servicing bridge. Thereby, minimizing the need for servicing via trucks and providing increased efficiency.

Another advantage of the present invention is that servicing of an aircraft may be performed from multiple servicing bridges on multiple sides of the aircraft simultaneously, further increasing servicing efficiency.

Furthermore, the present invention provides a servicing bridge that is capable of rotating to be embedded into the airline terminal as to allow for servicing of the bridge within and along a face of the terminal, further minimizing the need for servicing trucks and increasing servicing efficiency.

The present invention itself, together with further objects and attendant advantages, will be best understood by reference to the following detailed description, taken in conjunction with the accompanying drawing.

DETAILED DESCRIPTION OF THE PREFERRED EMBODIMENT

Figure 1:
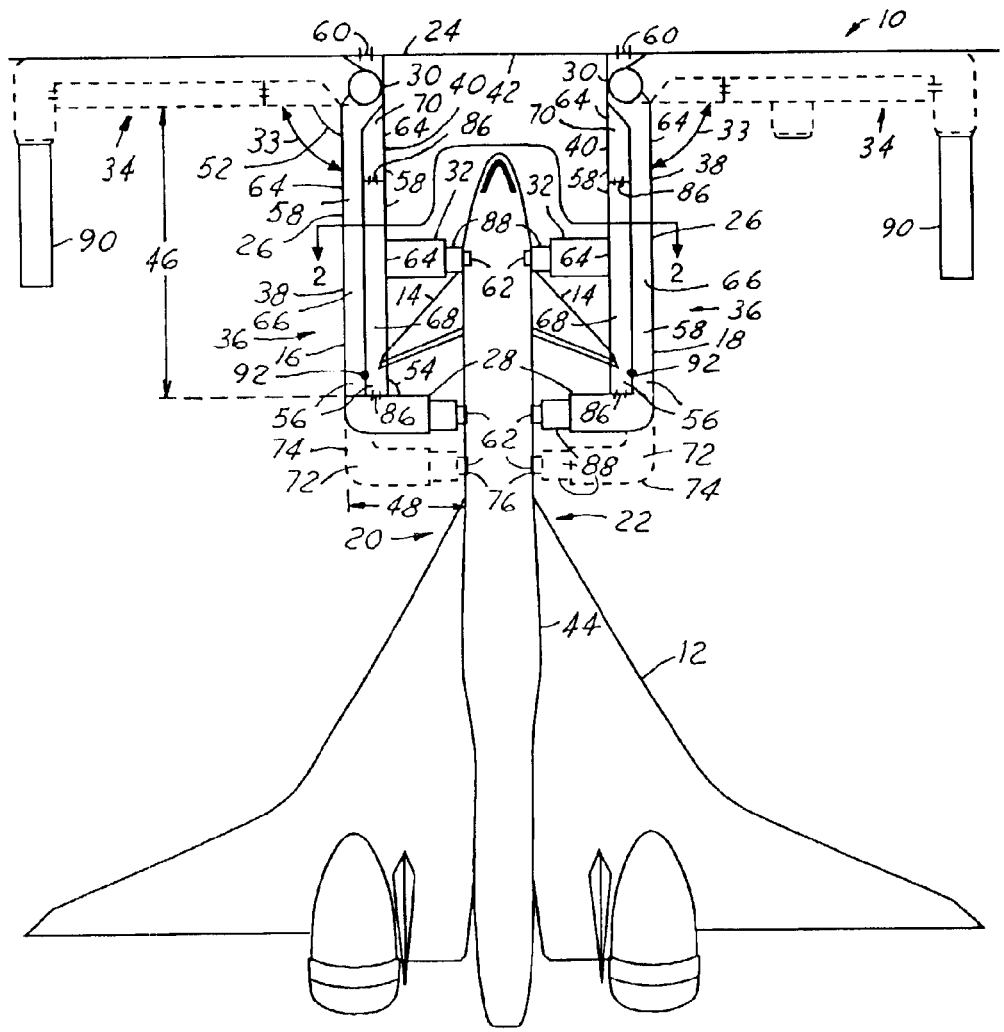
FIG. 1 is a top view of a multi-purpose aircraft servicing system that accommodates an aircraft with a canard wing in accordance with an embodiment of the present invention.

In each of the following figures, the same reference numerals are used to refer to the same components. While the present invention is described with respect to a method and system for servicing an aircraft, the present invention may be adapted for various applications and systems including: aeronautical systems, land-based vehicle systems, or other applications or systems known in the art that require servicing of a vehicle.

In the following description, various operating parameters and components are described for one constructed embodiment. These specific parameters and components are included as examples and are not meant to be limiting.

Also, in the following description the terms "bridge servicing unit" mean a portion of an airline bridge that is associated with a particular service such as passenger enplaning or deplaning services, galley services, cabin cleaning services, cargo services, or other services known in the art.

Figure 2:
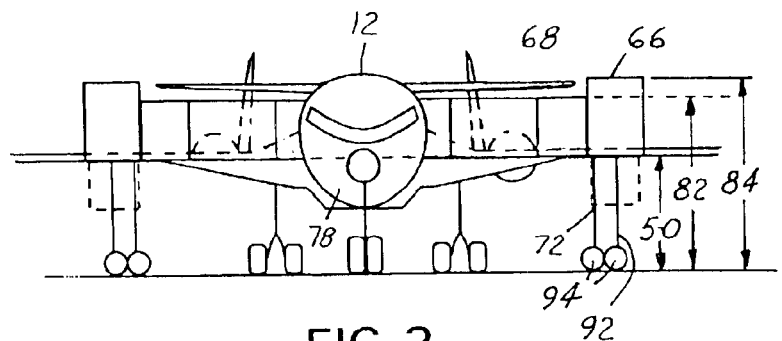
FIG. 2 is a front view of the multi-purpose aircraft servicing system that accommodates an aircraft with the canard wing in accordance with an embodiment of the present invention.

Referring now to FIGS. 1 and 2, a top view and a side view of a multi-purpose aircraft servicing system 10 that accommodates an aircraft 12 with a canard wing 14 in accordance with an embodiment of the present invention are shown. Although, the aircraft 12 is shown having a canard wing 14 the present invention may be applied to other aircraft including various types of wide-body aircraft. The multi-purpose system 10 includes a port side multi-servicing bridge 16 and a starboard side multi-servicing bridge 18, allowing for servicing on both a port side 20 and a starboard side 22, of the aircraft 12, simultaneously. Each servicing bridge 16 and 18 are mechanically coupled to an airline terminal 24 and have main bridge sections 26 and bridgeheads 28. The servicing bridges 16 and 18 may also have one or more rotundas 30 and additional bridge sections, not shown, and additional bridgeheads such as bridgeheads 32. Although two multi-service bridges are shown, any number of multi-service bridges may be incorporated.

The servicing bridges 16 and 18 rotate about the rotundas 30, along arcs 33, to a terminal servicing position 34 when the aircraft 12 is not parked at the terminal 24 and to an aircraft servicing position 36 when the aircraft 12 is parked at the terminal 24. The servicing bridges 16 and 18 are serviced in the terminal servicing position 34 and the aircraft 12 is serviced in the aircraft servicing position 36. The servicing bridges 16 and 18 have a terminal side 38 and an aircraft side 40. In the terminal servicing position 34 the terminal side 38 is abutted against a terminal face 42 and the servicing bridges 16 and 18 are approximately parallel with the face 42. The servicing bridges 16 and 18 when in the aircraft servicing position 36 are approximately parallel with a body 44 of the aircraft 12 and may be perpendicular to the face 42.

The servicing bridges 16 and 18 have various parameters that may be adjusted to accommodate for various applications and types and styles of aircraft. The parameters include a main bridge section length 46, a bridge head length 48, a servicing bridge height 50, and angles 52 and 54 of the main bridge sections 26 relative to the face 42 and the bridge heads 28. The parameters as well as other features of the present invention provide versatility in accommodating various aircraft configurations.

The main bridge sections 26 include multiple servicing passageways 56, each passageway may have multiple servicing units 58. The passageways 56 extend from the terminal 24 to the bridgeheads 28 and are used for passage of people, luggage, gear, and supplies from terminal gate door 60, through the servicing bridges 16 and 18, to aircraft servicing doors 62. Each servicing unit 58 has an associated housing 64 and may be coupled to an adjacent servicing unit 58. In one embodiment of the present invention the servicing units 58 include passenger units 66, galley units 68 and cabin-cleaning units 70.

The servicing units 58 may also include cargo units 72 or other servicing units known in the art. The cargo units 72 when utilized may be mechanically coupled below the passenger units 66 with additional bridgeheads 74 to mate with cargo doors 76 in a lower deck 78 of the aircraft 12. Utilizing the cargo units 72 potentially eliminates the need for cargo servicing trucks, since luggage may directly be transferred from the terminal 24 through the cargo units 72 to the aircraft 12. The main bridge sections 16 and 18 may also include telescoping sections or rotating sections as known in the art. In an embodiment of the present invention telescoping sections and rotating sections are not used within the main bridge sections 26 to minimize complexity and costs in manufacturing of the servicing bridges 16 and 18.

The servicing units 58 may include amenities such as heating, air conditioning, refrigeration, and storage. For example, in the terminal servicing position 34 galley storage, not shown, located within the galley units 68 may be pre-stocked with food and beverages, which may require refrigeration. The pre-stocking of supplies avoids direct contact of servicing trucks with the aircraft 12 and prevents potential aircraft contact damage. This is a significant benefit for future aircraft produced from composite structure material that is costly to repair. Note that for the embodiment illustrated galley unit height 82 is lower than passenger unit height 84 to accommodate for and avoid interference with the canard wing 14. The galley unit height 82 also allows for closer positioning of the servicing bridges 16 and 18 to the aircraft 12. Bridge doors 86 may exist between servicing units 58 for passage therebetween.

The bridgeheads 28 are similar to traditional bridgeheads in that they mate with the aircraft 12 and provide stable ingress and egress to and from the aircraft 12. The bridgeheads 28 have telescoping sections 88 to extend the bridgeheads 28 and prevent damage to the aircraft 12 upon contact. The bridgeheads 28 unlike traditional bridgeheads accommodate the passageways 56 and are capable of receiving supplies from servicing trucks 90 when the servicing bridges 16 and 18 are retracted to the face 42 and in the terminal servicing position 34.

The rotundas 30 are coupled to the main bridge sections 26 and the terminal 24 and provide a mechanism for rotating the servicing bridges 16 and 18 and passage between the terminal 24 and the servicing bridges 16 and 18. To further aid in the rotation of the servicing bridges 16 and 18 is a column support 92 on wheels 94.

Figure 3:
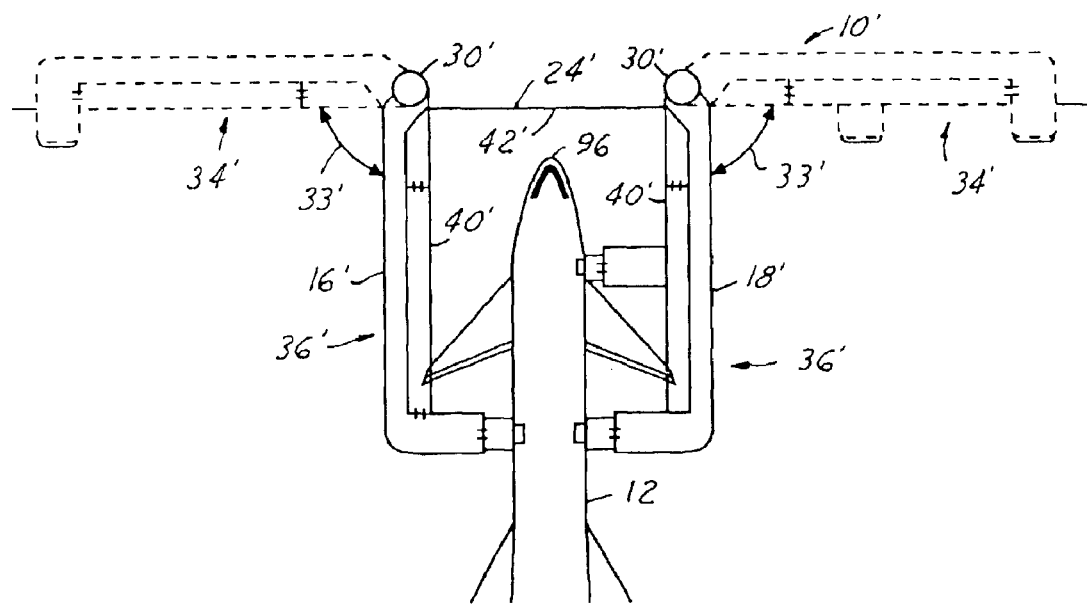
FIG. 3 is a top view of a multi-purpose aircraft servicing system having a terminal flush servicing design that accommodates an aircraft with a canard wing in accordance with another embodiment of the present invention.

Referring now to FIG. 3, a top view of a multi-purpose aircraft servicing system 10' having a terminal flush servicing design that accommodates the aircraft 12 in accordance with another embodiment of the present invention is shown. Unlike the servicing bridges 16 and 18 of FIG. 1, the servicing bridges 16' and 18' may be rotated so as to be embedded into the terminal 24'. The servicing bridges 16' and 18' are an integral part of the terminal 24' instead of being an appendage to the terminal 24, as with servicing bridges 16 and 18. Embedding the servicing bridges 16' and 18' into the terminal 24' decreases clearance between aircraft nose 96 and face 42'. Rotundas 30' are located on an opposite side of the face 42' away from the aircraft 12 such that the aircraft side 40' is flush with the face 42', when the servicing bridges 16' and 18' are in the terminal servicing position 34'. Galley and cabin cleaning supply may flow from a central location, not shown, within the terminal 24' and transferred to the servicing bridges 16' and 18' along the face 42'.

Figure 4:
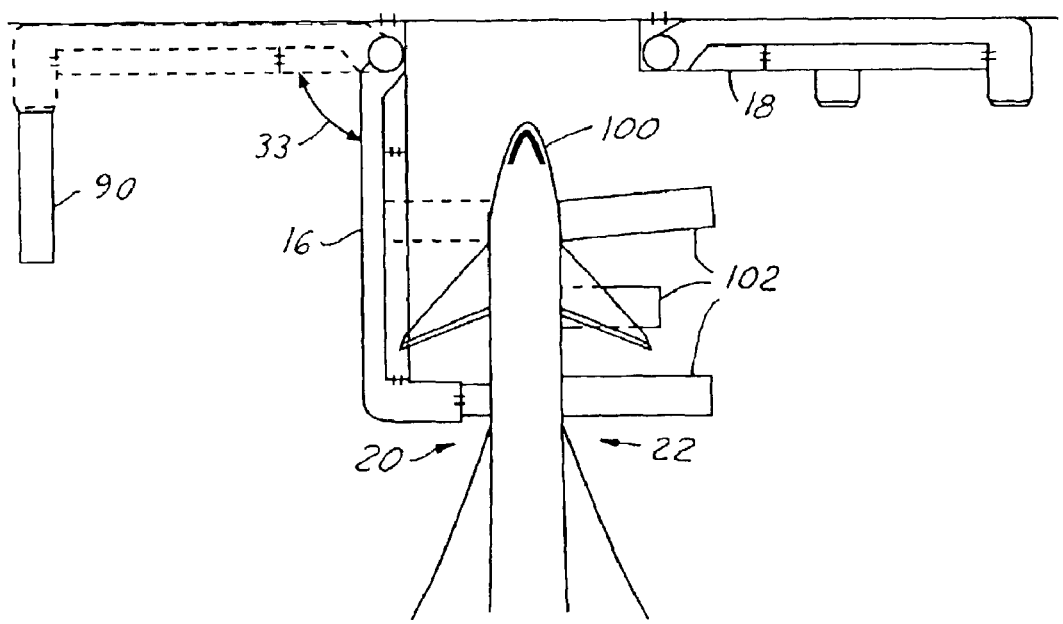
FIG. 4 is a top view of a multi-purpose aircraft servicing system that accommodates a traditional wide-body aircraft in accordance with yet another embodiment of the present invention.

Referring now to FIG. 4, a top view of the multi-purpose aircraft servicing system 10 illustrating the capability of accommodating traditional wide-body aircraft in accordance with yet another embodiment of the present invention is shown. The present invention, including systems 10 and 10', is capable of accommodating traditional style aircraft as well as newly introduced aircraft that may have a canard wing or other aircraft wing designs. For traditional style aircraft, such as aircraft 100, the port bridge 16 is utilized while the starboard bridge 18 is retracted into the terminal servicing position 34. In one embodiment of the present invention the starboard bridge 18 is nonexistent. Galley servicing and cabin-cleaning servicing is performed via the port bridge 16 on the port side 20 and by additional servicing trucks 102 on the starboard side 22. Note again that galley servicing and cabin-cleaning servicing may be performed simultaneously on both the port side 20 and the starboard side 22. The addition of galley service on the port side 20 reduces the overall galley service time, which in turn reduces aircraft turnaround time.

Figure 5:
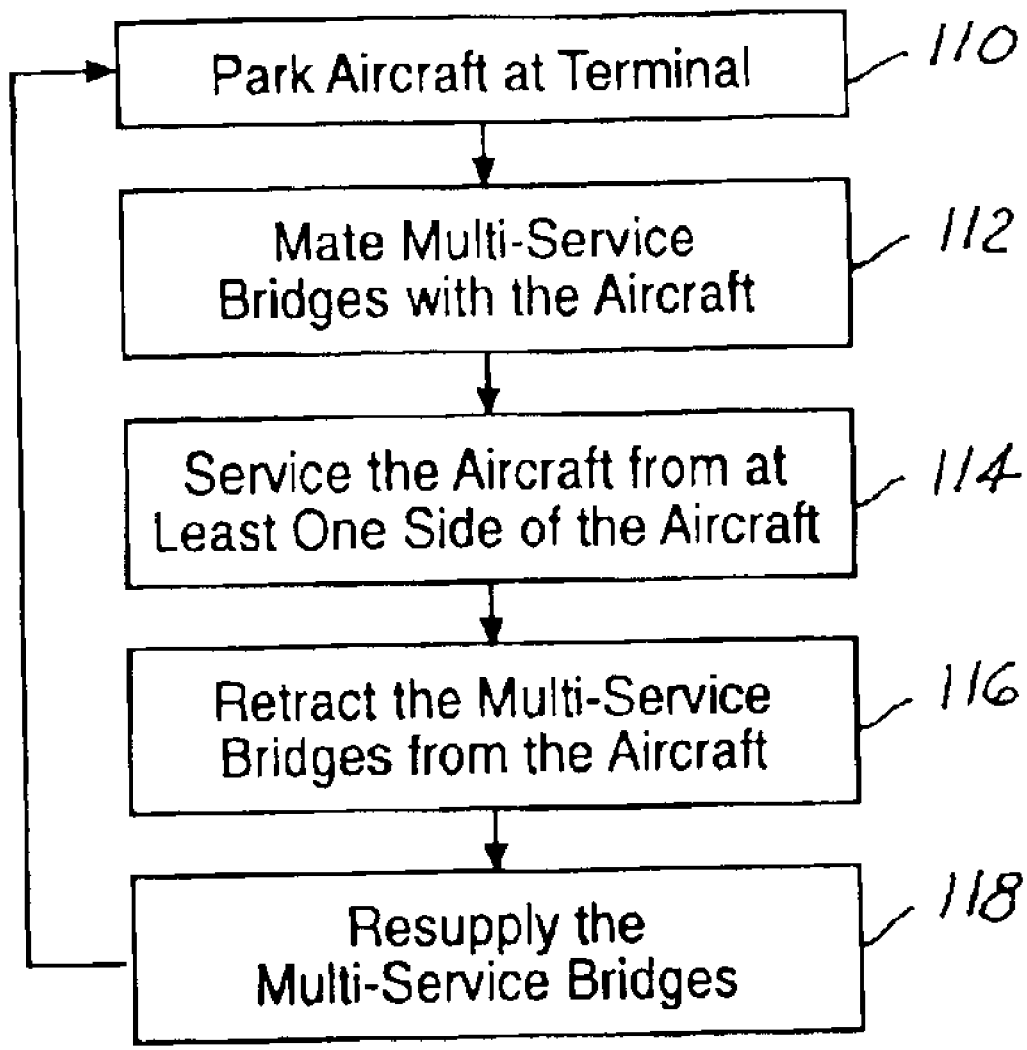
FIG. 5 is a logic flow diagram illustrating a method of servicing an aircraft within a multi-purpose aircraft servicing system in accordance with an embodiment of the present invention.

Referring now to FIG. 5, a logic flow diagram illustrating a method of servicing the aircraft 12 within the system 10 in accordance with an embodiment of the present invention is shown.

In step 110, the aircraft 12 is parked at the terminal 24.

In step 112, the servicing bridges 16 and 18 are rotated to mate with the aircraft 12. A servicing bridge parameter may be adjusted to accommodate the aircraft 12. Of course, the servicing bridges 16 and 18 are pre-stocked as described above before rotation of the servicing bridges 16 and 18 into the aircraft servicing position 36, as needed.

In step 114, the aircraft 12 is serviced from at least one side of the aircraft 12. The passengers deplane the aircraft 12 from both the port side 20 and the starboard side 22, through the passenger units 66, followed by galley servicing and cabin-cleaning servicing also from both the port side 20 and the starboard side 22, through respective galley units 68 and cabin-cleaning units 70. Cargo servicing may be performed simultaneously with the other servicing, since cargo servicing is performed on a different deck level and may also be performed on both the port side 20 and the starboard side 22, via cargo units 72.

In step 116, upon completion of servicing the aircraft 12 including allowance of passengers to enplane the aircraft 12 the servicing bridges 16 and 18 are retracted from the aircraft 12 and the servicing doors 62 are closed. The servicing bridges 16 and 18 may be rotated such that the terminal side 38 is approximately flush with the face 42 or, in the case of system 10', the servicing bridges 16' and 18' may be rotated such that the terminal side 38' is embedded into the terminal 24' and the aircraft side 40' is approximately flush with the face 42'.

In step 118, the servicing bridges 16 and 18 are serviced along the face 42, including restocking of supplies. Upon completion of step 118, step 110 is performed.

The above-described steps, are meant to be an illustrative example, the steps may be performed sequentially, synchronously, or in a different order depending upon the application.

The present invention therefore provides a multi-purpose aircraft servicing system that minimizes servicing time of an aircraft. The servicing system is applicable to various aircraft and is cost effective. The present invention is capable of servicing an aircraft on both a port side and a starboard side simultaneously. Thus, the present invention increases overall utilization of an aircraft.

The above-described apparatus and method, to one skilled in the art, is capable of being adapted for various applications and systems including: aeronautical systems, land-based vehicle systems, or other applications or systems known in the art that require servicing of a vehicle. The above-described invention can also be varied without deviating from the true scope of the invention.

What is claimed is:

1. A multi-purpose aircraft servicing system for an aircraft comprising:
   at least one multi-servicing bridge comprising:
      at least one main bridge section having a plurality of bridge servicing units having a plurality of associated housings that are sectioned portions of said at least one main bridge section; and
      at least one bridgehead mechanically coupled to said at least one main bridge section and mating to the aircraft.

2. A system as in claim 1 wherein said at least one multi-servicing bridge further comprises at least one rotunda mechanically coupled to said at least one main bridge section, said at least one multi-servicing bridge is rotatable about said at least one rotunda.

3. A system as in claim 1 wherein said at least one multi-servicing bridge comprises at least one telescoping section.

4. A system as in claim 1 comprising:
   a first multi-servicing bridge for mating to a port side of the aircraft; and
   a second multi-servicing bridge for mating to a starboard side of the aircraft.

5. A system as in claim 1 wherein said at least one multi-servicing bridge comprises:
   a first servicing unit having a first housing; and
   a second servicing unit having a second housing and coupled to said first servicing unit, said second servicing unit being shorter in height than said first servicing unit.

6. A system as in claim 5 wherein said second servicing unit is lower in height relative to a wing of the aircraft.

7. A system as in claim 1 wherein said at least one multi-servicing bridge comprises a plurality of servicing passageways.

8. A system as in claim 7 wherein at least one of said plurality of servicing passageways comprises at least two of said plurality of bridge servicing units.

9. A system as in claim 1 wherein said at least one multi-servicing bridge comprises:
   a passenger-servicing passageway; and
   a cargo-servicing passageway mechanically coupled to and below said passenger-servicing passageway.

10. A system as in claim 1 wherein said at least one main bridge section comprises a plurality of servicing amenities.

11. A system as in claim 1 wherein said at least one multi-servicing bridge is mechanically coupled to and embedded into an airline terminal.

12. A system as in claim 1 wherein said at least one multi-servicing bridge is serviceable via a servicing truck.

13. A system as in claim 1 wherein a multi-servicing bridge of said at least one multi-servicing bridge comprises a plurality of bridgeheads.

14. A system as in claim 1 wherein at least a portion of said at least one multi-servicing bridge is height adjustable.

15. A multi-purpose aircraft servicing system for an aircraft comprising:
   at least one multi-servicing bridge comprising:
      at least one rotunda;
      at least one main bridge section mechanically coupled to said at least one rotunda and having a plurality of passageways that are sectioned portions of said at least one main bridge section, wherein at least one of said plurality of passageways comprise a plurality of bridge servicing units having a plurality of associated housings; and at least one bridgehead mechanically coupled to said at least one main bridge section and mating to the aircraft;

said at least one multi-servicing bridge rotatable about said at least one rotunda.

16. A method of servicing an aircraft within a multi-purpose aircraft servicing system comprising:

proving at least one multi-servicing bridge having a plurality of bridge servicing units with corresponding housings that are sectioned portions of a main bridge section;

parking the aircraft at a terminal;

rotating at least one multi-servicing bridge to mate with the aircraft; and servicing the aircraft from at least one side of the aircraft.

17. A method as in claim 16 wherein servicing the aircraft comprises:

deplaning and enplaning passengers from at least one side of the aircraft;

performing galley servicing from at least one side of the aircraft;

performing cabin cleaning servicing from at least one side of the aircraft; and performing cargo servicing from at least one side of the aircraft.

18. A method as in claim 16 further comprising:

rotating said at least one multi-servicing bridge to be embedded into an airline terminal having a terminal face; and supplying at least one bridge servicing unit along said terminal face.

19. A method as in claim 16 wherein servicing the aircraft comprises servicing both a port side and a starboard side of the aircraft simultaneously.

20. A method as in claim 16 further comprising adjusting a servicing bridge parameter.

* * * * *

UNITED STATES PATENT AND TRADEMARK OFFICE
CERTIFICATE OF CORRECTION

| | | |
|---|---|---|
| PATENT NO. | : 6,863,243 B2 | Page 1 of 1 |
| APPLICATION NO. | : 10/242179 | |
| DATED | : March 8, 2005 | |
| INVENTOR(S) | : Konya et al. | |

It is certified that error appears in the above-identified patent and that said Letters Patent is hereby corrected as shown below:

Title page, item [75] Inventorship: add Richard Johnson and Kim Ohimann inventors, Kazuhide Konya and William R. McCoskey.

Signed and Sealed this

Thirty-first Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 6,863,243 B2  Page 1 of 1
APPLICATION NO. : 10/242179
DATED : March 8, 2005
INVENTOR(S) : Konya et al.

It is certified that error appears in the above-identified patent and that said Letters Patent is hereby corrected as shown below:

Title page, item [75] Inventorship: add Richard Johnson and Kim Ohlmann to existing inventors, Kazuhide Konya and William R. McCoskey.

This certificate supersedes Certificate of Correction issued October 31, 2006.

Signed and Sealed this

Thirteenth Day of February, 2007

JON W. DUDAS
*Director of the United States Patent and Trademark Office*